United States Patent [19]

Dyer

[11] Patent Number: 4,522,633
[45] Date of Patent: Jun. 11, 1985

[54] ABRASIVE BODIES

[76] Inventor: Henry B. Dyer, P.O. Box 67276, Bryanston, Transvaal, South Africa

[21] Appl. No.: 519,800

[22] Filed: Aug. 3, 1983

[30] Foreign Application Priority Data

Aug. 5, 1982 [ZA] South Africa .................. 82/5661

[51] Int. Cl.[3] ...................... C23C 11/14; C04B 35/58
[52] U.S. Cl. .................................. 51/307; 51/309; 428/698; 428/699; 428/701
[58] Field of Search ............... 428/698, 699, 701; 51/307, 309

[56] References Cited

U.S. PATENT DOCUMENTS

| | | | |
|---|---|---|---|
| 4,096,297 | 6/1978 | Pappis et al. | 428/698 X |
| 4,148,964 | 4/1979 | Fedoseer et al. | 428/698 X |
| 4,389,465 | 6/1983 | Nakai et al. | 428/698 |
| 4,403,015 | 9/1983 | Nakai et al. | 428/698 X |

FOREIGN PATENT DOCUMENTS 0040552 11/1981 European Pat. Off. ............ 428/698

Primary Examiner—George F. Lesmes
Assistant Examiner—Nancy A. B. Swisher
Attorney, Agent, or Firm—Beveridge, DeGrandi & Weilacher

[57] ABSTRACT

An abrasive body which comprises a cubic boron nitride compact bonded to a substrate. The compact has intergrowth between the cubic boron nitride particles which provides it with good thermal conductivity and has major surfaces on each of opposite sides, the one surface being bonded to the substrate and the other surface presenting a cutting edge. The substrate has a coefficient of thermal conductivity at least four times lower than that of the compact. The substrate is preferably made of aluminium oxide, Syalon or zirconia.

10 Claims, 2 Drawing Figures

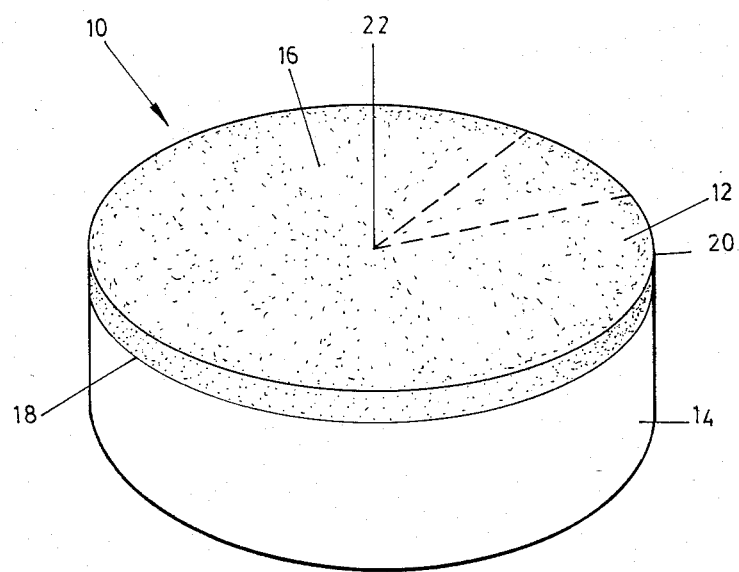
FIG_1
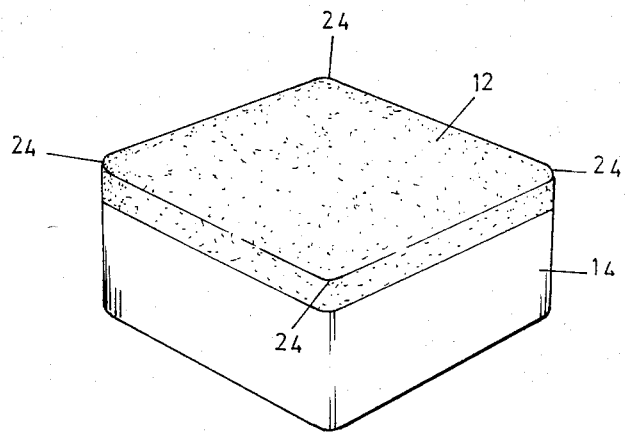
FIG_2

ABRASIVE BODIES

BACKGROUND OF THE INVENTION

This invention relates to abrasive bodies.

Cubic boron nitride abrasive compacts are well known in the art and are used in the cutting, grinding and otherwise abrading of various workpieces, particularly iron-containing workpieces. In use, they may be mounted directly on to a tool or bonded to a cemented carbide backing prior to mounting on to the tool.

Cubic boron nitride compacts consist essentially of a mass of cubic boron nitride particles present in an amount of at least 70 percent, preferably 80 to 90 percent, by volume of the compact bonded into a hard conglomerate. The compacts are polycrystalline masses and can replace single large crystals.

Cubic boron nitride compacts invariably contain a second bonding phase which may contain a catalyst (also known as a solvent) for cubic boron nitride growth. Examples of suitable catalysts are aluminium or an alloy of aluminium with nickel, cobalt, iron, manganese or chromium. When the bonding matrix contains a catalyst, a certain amount of intergrowth between the cubic boron nitride particles occurs during compact manufacture.

Cubic boron nitride compacts are made under conditions of temperature and pressure at which the cubic boron nitride particles are crystallographically stable.

U.S. Pat. No. 3,982,911 describes another type of composite abrasive body comprising a layer of alloy-bonded cubic boron nitride crystals directly bonded to a metal substrate. The abrasive body is manufactured under relatively low pressure conditions which will not result in intergrowth occurring between the cubic boron nitride particles.

SUMMARY OF THE INVENTION

According to the present invention, there is provided a cubic boron nitride compact having major surfaces on each of opposite sides thereof, the one surface being bonded to a substrate, and the other surface presenting a cutting edge, the compact comprising a first phase of a polycrystalline mass of intergrown cubic boron nitride particles and a second bonding phase and the substrate having a coefficient of thermal conductivity at least four times lower than that of the compact.

DESCRIPTION OF THE DRAWING

FIGS. 1 and 2 are perspective views of two embodiments of the invention.

DETAILED DESCRIPTION OF THE INVENTION

The abrasive body may have any suitable shape. It may have a disc shape or any other shape such as a segment of a disc, triangular, rectangular or square. A disc-shaped abrasive body may be fragmented into fragments of any suitable shape using known cutting techniques such as laser cutting or spark erosion.

As mentioned above, one of the major surfaces of the compact will be bonded to a substrate, while the other major surface will present a cutting edge. The cutting edge may, in one embodiment, be a cutting point, for example the pointed end of the segment of a disc or a corner of a body of triangular, rectangular or square shape.

In use, a cutting point or edge of the cubic boron nitride compact will perform the abrading operation. Heat will be generated at this point and will be conducted through the cubic boron nitride relatively rapidly to the substrate. The intergrowth between the cubic boron nitride particles ensures that the compact has a relatively high coefficient of thermal conductivity, i.e. of the order of 100 $Wm^{-1}K^{-1}$. Because the substrate has a coefficient of thermal conductivity substantially less than that of the cubic boron nitride compact, the heat will be dissipated only slowly through the substrate and tend to concentrate in the thin compact. This, it has surprisingly been found, improves the abrading performance of the compact.

In the prior art, cubic boron nitride compacts having intergrowth between the cubic boron nitride particles have been bonded either directly to a metal tool or to a cemented carbide substrate. Both such substrates have high coefficients of thermal conductivity and of the same order as that of the cubic boron nitride compact. The improvement in the abrading performance of the compact in the abrasive body of the invention over such prior art bodies is particularly surprising as it has always been believed that heat generated in the compact should be removed from the compact as quickly as possible to minimise any degradation of the cubic boron nitride particles occurring.

The substrate will generally be larger in mass than the compact and should have good mechanical strength and a coefficient of thermal expansion close to that of the compact. Examples of suitable materials for the substrate are oxides, nitrides and Syalon (a commercially available silicon/aluminium/nitrogen/oxygen ceramic). Examples of suitable nitrides are boron nitride, aluminium nitride and silicon nitride; examples of suitable oxides are aluminium oxide and zirconia. Of these materials aluminium oxide, zirconia and Syalon are preferred. These materials will be in a sintered coherent form.

It is important that the cubic boron nitride compact has intergrowth between the particles for it is this which contributes largely to the good thermal conductivity which such compacts possess. The second phase may be metallic in nature, and examples of such compacts are described in U.S. Pat. Nos. 3,743,489 and 3,767,371. The second phase may also be ceramic in nature and such compacts are preferred. Examples of such compacts are described in U.S. Pat. No. 3,944,398 where the second phase consists essentially of silicon nitride and a ceramic resulting from the interaction of aluminium with silicon nitride, or British Patent Publication No. 2,048,927 where the second phase consists essentially of aluminium nitride and/or aluminium diboride.

Bonding of the compact to the substrate may be direct or through a metal or alloy bonding layer. Suitable metals and alloys for the bonding layer, when used, are well known in the art, as are the techniques and methods for bonding the compact to the substrate. The abrasive bodies of the invention have particular application as cutting tool inserts.

An embodiment of the invention will now be described with reference to FIG. 1 of the accompanying drawing. Referring to this drawing, there is shown a disc-shaped abrasive body 10 comprising a cubic boron nitride compact 12 bonded to a substrate 14 which is larger in mass than the compact. The compact 12 has an upper major surface 16 and a lower major surface 18 which is bonded to the substrate 14. As mentioned above, bonding between the surface 18 and the substrate 14 may be direct or through a metal or alloy bonding layer. In use, the circular edge 20 of surface 16 provides the cutting edge for the abrasive body.

The abrasive body may be fragmented into fragments of any suitable shape using known cutting techniques such as spark erosion or laser cutting. For example, the abrasive body may be fragmented into a series of segments, one of which is illustrated by the dotted lines. In such a case, it is the point 22 of the segment which provides the cutting point.

FIG. 2 illustrates an abrasive body similar to that of FIG. 1, save that it has a square shape. Like parts carry like numerals. The corners 24 provide cutting points in use.

In an example of the invention, a cubic boron nitride compact of disc-shape (as illustrated by FIG. 1) was produced using the method described in British Patent Publication No. 2,048,927. The compact consisted of a polycrystalline mass of intergrown cubic boron nitride particles and a second bonding phase consisting essentially of aluminium nitride and/or diboride. The cubic boron nitride content of the compact was 85 percent by volume. The coefficient of thermal conductivity of the compact was 100 $Wm^1K^{-1}$. From this compact was cut a square-shaped compact using known laser cutting techniques. A substrate consisting of sintered coherent aluminium oxide and having a coefficient of thermal conductivity of 8.4 $Wm^{-1}K^{-1}$ was produced. The substrate also had a square shape.

A major surface of the compact was bonded to a major surface of the substrate to produce an abrasive body as illustrated by FIG. 2 of the accompanying drawing. Bonding between the compact and the substrate was achieved using an alloy bonding layer. The alloy was placed between the compact and substrate, a load applied to urge the compact and substrate together and the temperature raised to above the melting point of the alloy. Heating took place in a vacuum of $10^{-5}$ Torr to minimise degradation of the cubic boron nitride particles of the compact. The compact and substrate were firmly bonded together on returning to ambient temperature. The alloy of the bonding layer was a copper/manganese based layer.

Using the method described above, a similar cubic boron nitride compact was bonded to a Syalon substrate and a zirconia substrate. Syalon has a coefficient of thermal conductivity of 23 $Wm^{-1}K^{-1}$. Zirconia has a coefficient of thermal conductivity similar to that of aluminium oxide.

The three abrasive bodies were compared with an unbacked cubic boron nitride compact of the type described in British Patent Publication No. 2,048,927 in the machining of a workpiece made of a D3 tool steel. All three abrasive bodies out performed the unbacked compact.

I claim:

1. An abrasive body comprising a cubic boron nitride compact having major surfaces on each of opposite sides thereof, the one surface being bonded to a substrate, and the other surface presenting a cutting edge, the compact comprising a first phase of a polycrystalline mass of intergrown cubic boron nitride particles and a second bonding phase and the substrate having a coefficient of thermal conductivity at least four times lower than that of the compact.

2. An abrasive body according to claim 1 which is disc shaped.

3. An abrasive body according to claim 1 which has a shape selected from a segment of a disc rectangular, triangular or square.

4. An abrasive body according to claim 1 wherein the substrate is larger in mass than the compact.

5. An abrasive body according to claim 1 wherein bonding of the one surface of the compact to the substrate is achieved through a metal or alloy bonding layer.

6. An abrasive body according to claim 1 wherein the substrate is made of an oxide, nitride or Syalon.

7. An abrasive body according to claim 6 wherein the substrate is made of a material selected from aluminium oxide, zirconia, Syalon, boron nitride, aluminium nitride and silicon nitride.

8. An abrasive body according to claim 1 wherein the second phase of the compact is metallic in nature.

9. An abrasive body according to claim 1 wherein the second phase of the compact is ceramic in nature.

10. An abrasive body according to claim 9 wherein the second phase consists of aluminium nitride and/or aluminium diboride.

* * * * *